United States Patent
Lowry et al.

(10) Patent No.: US 12,287,950 B2
(45) Date of Patent: *Apr. 29, 2025

(54) USER INTERFACE FOR SEARCHING CONTENT OF A COMMUNICATION PLATFORM USING REACTION ICONS

(71) Applicant: Salesforce, Inc., San Francisco, CA (US)

(72) Inventors: Mckenna Lowry, Valhalla, NY (US); Austen Payan, New York City, NY (US); Anthony Tae Jin Lee, Oakland, CA (US); Racine Harris, New York, NY (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,428

(22) Filed: Aug. 25, 2023

(65) Prior Publication Data

US 2023/0400961 A1 Dec. 14, 2023

Related U.S. Application Data

(63) Continuation of application No. 18/099,788, filed on Jan. 20, 2023, now Pat. No. 11,822,764, which is a continuation of application No. 17/364,636, filed on Jun. 30, 2021, now Pat. No. 11,561,673.

(51) Int. Cl.
G06F 3/04817 (2022.01)
G06F 3/0482 (2013.01)
H04L 51/02 (2022.01)

(52) U.S. Cl.
CPC ........ *G06F 3/04817* (2013.01); *G06F 3/0482* (2013.01); *H04L 51/02* (2013.01)

(58) Field of Classification Search
CPC ..... G06F 3/04817; G06F 3/0482; H04L 51/02
See application file for complete search history.

(56) References Cited

U.S. PATENT DOCUMENTS

2013/0086519 A1* 4/2013 Fino ........................ G11B 27/34
715/810
2013/0159919 A1* 6/2013 Leydon ............... G06F 3/04886
715/780
2016/0048492 A1 2/2016 Barrett et al.
(Continued)

OTHER PUBLICATIONS

U.S. Appl. No. 16/993,859, filed Aug. 14, 2020, Butterfield, et al., "Electronic Board Associated With a Communication Platform", 45 pages.

(Continued)

*Primary Examiner* — Seth A Silverman
(74) *Attorney, Agent, or Firm* — Lee & Hayes, P.C.

(57) ABSTRACT

A user interface comprising at least a set of reaction icons configured to initiate a search of content of a communication platform is described. In an example, at least the set of reaction icons can be presented via the user interface of the communication platform, wherein individual reaction icons of the set of reaction icons are selectable as search parameters in the user interface. In response to receiving a selection of at least one reaction icon, a search for content, associated with the at least one reaction icon, stored in a database associated with the communication platform can be initiated.

20 Claims, 7 Drawing Sheets

(56) References Cited

U.S. PATENT DOCUMENTS

| | | | |
|---|---|---|---|
| 2017/0308289 A1* | 10/2017 | Kim | G06F 3/0237 |
| 2018/0246983 A1 | 8/2018 | Rathod | |
| 2018/0287982 A1 | 10/2018 | Draeger et al. | |
| 2019/0325034 A1* | 10/2019 | Morrison | G06F 16/24578 |
| 2021/0382590 A1* | 12/2021 | Fong | H04L 51/42 |
| 2021/0397270 A1* | 12/2021 | Misra | G06F 3/0237 |
| 2023/0004277 A1 | 1/2023 | Lowry et al. | |
| 2023/0161451 A1 | 5/2023 | Lowry et al. | |

OTHER PUBLICATIONS

U.S. Appl. No. 17/111,408, filed Dec. 3, 2020, Khosrowshahi, "Integrating a Third-Party Platform Into a Communication Platform", 53 pages.

U.S. Appl. No. 17/163,017, filed Jan. 29, 2021, McCue, et al., "Utilizing Message Metadata for Improving User Interface Presentation", 72 pages.

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;26 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (Nov. 2018) 16 pages.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516> (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000), pp. 154-161.

Office Action for U.S. Appl. No. 17/364,636, mailed on Mar. 22, 2022, Lowry, "User Interface for Searching Content of a Communication Platform Using Reaction Icons", 21 pages.

Dikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/> (dated Oct. 17, 2017) 13 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 5 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

USER INTERFACE FOR SEARCHING
CONTENT OF A COMMUNICATION
PLATFORM USING REACTION ICONS

CROSS-REFERENCE TO RELATED
APPLICATIONS

This application claims priority to and is a continuation of U.S. patent application Ser. No. 18/099,788, filed on Jan. 20, 2023, which is a continuation of U.S. patent application Ser. No. 17/364,636, filed on Jun. 30, 2021, the entire contents of each of which are incorporated herein by reference.

TECHNICAL FIELD

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices (e.g., clients), allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. In some examples, the user interface can present a data feed indicating messages posted to and/or actions taken with respect to a particular channel, direct message, and/or other virtual space.

BRIEF DESCRIPTION OF THE FIGURES

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
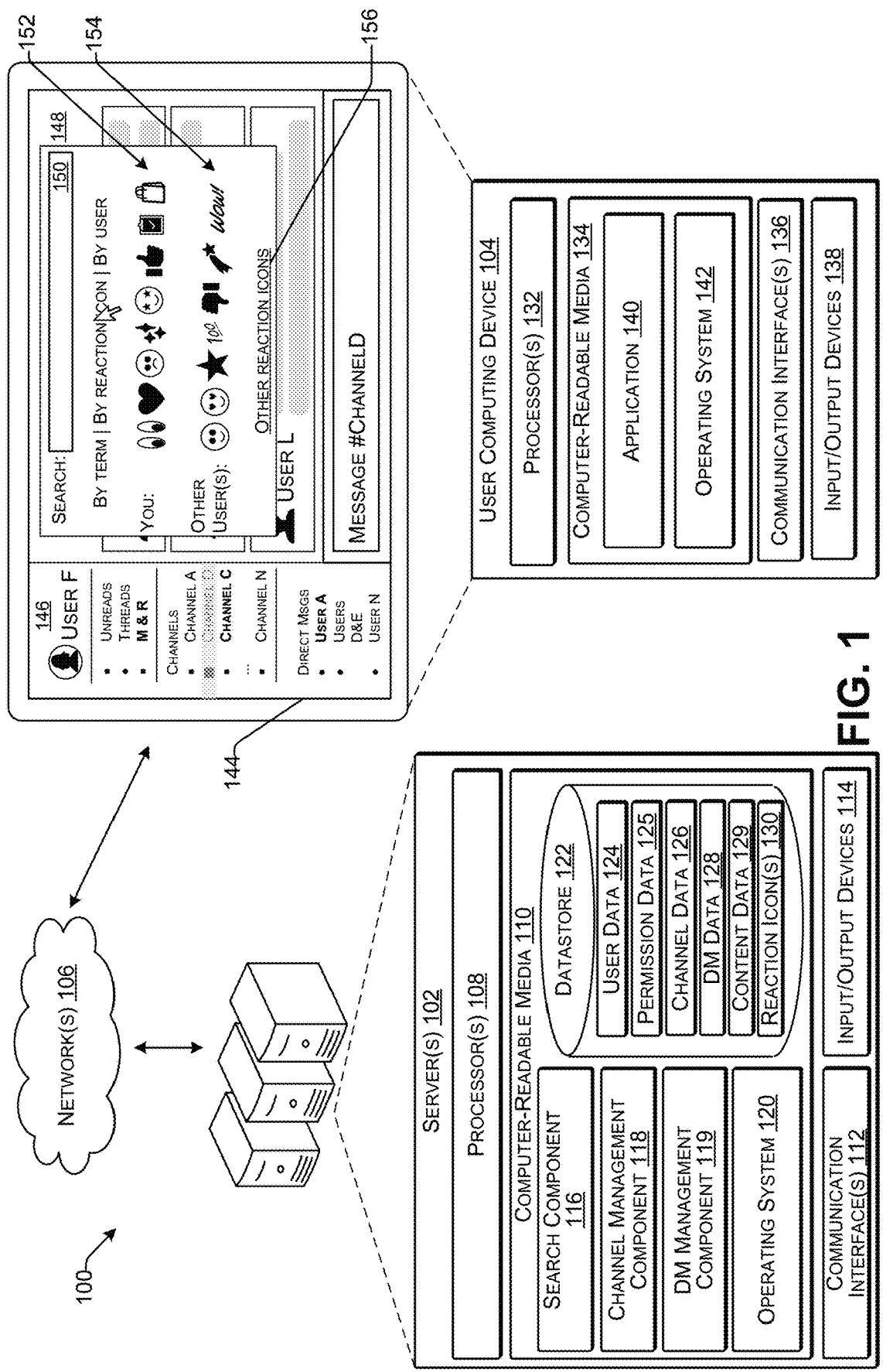
FIG. 1 illustrates an example environment for performing techniques described herein.

This application relates to a user interface that is configured to present set(s) of reaction icons (e.g., emojis, reactjis, and/or the like) to facilitate a search of content associated with a communication platform. The communication platform, which, in some examples can be a group-based communication platform, a channel-based communication platform, a permission-based communication platform, a channel-based messaging platform, and/or any other platform for facilitating communication between and among users, can enable users to exchange messages and/or other data via the communication platform. In an example, the communication platform can curate set(s) of reaction icons for individual users, groups of users, and/or the like based at least in part on interaction data associated with content of the communication platform. In some examples, at least one of recency of interaction with individual reaction icon(s), frequency of interaction with individual reaction icon(s), and/or the like can be determined based at least in part on the interaction data and such recency of interaction with individual reaction icon(s), frequency of interaction with individual reaction icon(s), and/or the like can be used to curate the set(s) of reaction icons. In at least one example, individual reaction icon(s) in a set of reaction icons can be selectable as search parameter(s). That is, in at least one example, selection of a reaction icon can trigger a search for content, stored in a database of the communication platform, that is associated with the selected reaction icon. The communication platform can return a result with identified content.

A "message," as used herein, can refer to any electronically generated digital object provided by a user of the communication platform. A message can be configured for presentation within a channel, a direct message, and/or another virtual space as described herein. In at least one example, a message can be associated with message content, which can include text data, image data, video data, audio data, file(s), etc. In some examples, one or more users of the communication platform can interact with a message, for example, by associating a reaction icon (e.g., an emoji, a reactji, or the like) with the message. In some examples, one or more users of the communication platform can interact with a message by replying to the message. In some examples, a reply can be posted to a feed associated with a channel, direct message, or other virtual space. In other examples, a reply can comprise a new message in a "thread." A thread can be a message associated with another message that is not posted to a channel, direct message, or other virtual space, but instead is maintained within an object associated with the original message. Messages and associated reactions (e.g., reaction icon(s) and/or reply(s)) can be stored in a datastore of the communication platform as "content" of the communication platform.

In at least one example, the content of the communication platform, can be searchable, for example by term (e.g., key word), reaction icon, user, date, virtual space, and/or the like. That is, in at least one example, the communication platform can provide an affordance via a user interface to enable a user to search content of the communication platform via one or more search parameters. Such an affordance can enable a user to designate the one or more search parameters, which can be term(s), reaction icon(s), user(s), date(s), virtual space(s), and/or the like. In response to receiving a search request associated with one or more search parameters, the communication platform can perform a search of a datastore associated with the communication platform. The datastore can store content, as described above. Based at least in part on identifying one or more items of content that satisfy the search parameters, the communication platform can return one or more search results.

In at least one example, techniques described herein relate to determining set(s) of reaction icons to present via a user interface to enable a user to search by reaction icon(s). That is, the communication platform can curate set(s) of one or more reaction icons that can be presented via a user interface for facilitating a search. Set(s) of reaction icons can be determined based at least in part on frequency of interaction with individual reaction icons, recency of interaction with individual reaction icons, and/or the like. In some examples, a set of reactions icons, which can comprise one or more reaction icons, can be particular to a user, a group of users, or the communication platform, generally. In at least one example, a reaction icon can comprise a search parameter such that upon receiving a search request associated with the reaction icon, the communication platform can perform a search for content associated with the communication platform that is associated with the reaction icon. If content associated with the communication platform is identified, the communication platform can return such content as a search result.

Techniques described herein can be helpful for easily retrieving content associated with the communication platform. For example, a user can desire to recall a message posted to a channel where other users reacted with a particular reaction icon (e.g., a dancing chicken reactji). In existing techniques a user can search via a term, a user, a date, a virtual space, or the like, but the user may not recall a term, user, date, virtual space, or the like associated with the message. The user may recall how people reacted (e.g., using a dancing chicken reactji). In some existing techniques, if a user knows how a particular reaction icon is named or defined, the user could input the name or definition of the particular reaction icon (e.g., :dancing chicken:) into the search affordance. However, if a user does not know how a particular reaction icon is named or defined, the user may be left without a mechanism to retrieve the content. As such, techniques described herein offer an improvement to existing search technology.

As described above, techniques described herein utilize interaction data associated with content exchanged via the communication platform to determine set(s) of reaction icons that are relevant to a particular user. As described above, at least one set of reaction icons can be determined based at least in part on frequency and/or recency of interaction with particular reaction icons, for example, by the user or a group of users with which the user may be similar to or otherwise related. As such, the communication platform can cause set(s) of reaction icons to be presented via a user interface, that are in some examples relevant or otherwise personalized for a user, to enable the user to select or otherwise set search parameters for a search.

Techniques described herein offer improvements over existing search technologies by improving user interfaces used to facilitate searches, reducing the number of interactions required to retrieve content, and/or streamlining user interaction with user interfaces. That is, by presenting an affordance for a user to designate search parameters via an interaction with set(s) of reaction icons, techniques described herein provide a more user-friendly mechanism to initiate a search. As described herein, the set(s) of reaction icons can be determined to be relevant to a particular user and thus can narrow, at least initially, the search parameters presented for the user for selection. Further, by presenting an affordance for a user to designate search parameters via an interaction with set(s) of reaction icons, techniques described herein eliminate the need for a user to recall a term, user, virtual space, date, reaction icon name and/or definition, and/or the like. As such, search queries can be more accurate and/or precise, thereby reducing the number of interactions required to retrieve content via a search. This can conserve bandwidth and computing resources. Moreover, by determining and/or presenting relevant information, users need not navigate through various search parameter possibilities and search results can be more accurate and/or precise (due to search queries being more accurate and/or precise). As such, techniques described herein offer improvements over conventional search technologies.

Additional or alternative benefits offered by techniques described herein are described herein.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, messages, and/or virtual spaces, have security (that can be defined by permissions) to limit access to defined groups of users, such a defined group of users having, for instance, sole access to a given channel, message, and/or virtual space. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other, within secure and private virtual spaces, such as channel(s), direct message(s), board(s), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces or a workspace can be associated with multiple organizations.

In at least one example, the server(s) 102 can communicate with a user computing device 104 via one or more network(s) 106. That is, the server(s) 102 and the user computing device 104 can transmit, receive, and/or store data (e.g., content, messages, and/or the like) using the network(s) 106, as described herein. In some examples, the user computing device 104 can comprise a "client" associated with a user. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., based at least in part on an organization chart) and/or types (e.g., administrator, verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, messages, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a search component 116, a channel management component 118, a direct message management component 119, an operating system 120, and a datastore 122.

In at least one example, the search component 116 can facilitate searches of content associated with the communication platform. As described above, in at least one example, the content of the communication platform, can be searchable, for example by one or more search parameters. A search parameter can comprise a term (e.g., key word), reaction icon, user, date, virtual space, and/or the like. In some examples, a search request (or "search query") can be associated with one or more search parameters. In at least one example, the search component 116 can provide an affordance via a user interface to enable a user to search content of the communication platform via one or more search parameters. Such an affordance can enable a user to designate the one or more search parameters, which can be term(s), reaction icon(s), user(s), date(s), virtual space(s), and/or the like. In response to receiving a search request associated with one or more search parameters, the search component 116 can perform a search of the datastore 122. In at least one example, based at least in part on identifying one or more items of content that satisfy the search parameters, the search component 116 can return one or more search results. The one or more search results can be presented via a user interface of the communication platform. In at least one example, if no items of content satisfy the search parameters, the search component 116 can return an indication that there are no search results.

In at least one example, the search component 116 can determine set(s) of reaction icons to present via a user interface to enable a user to search by reaction icon(s). As described above, a set of reaction icons can comprise one or more reaction icons. Further, as described above, a set of reaction icons can include one or more emojis, reactjis, or the like. Set(s) of reaction icons can be determined based at least in part on frequency of interaction with individual reaction icons, recency of interaction with individual reaction icons, a number of times a particular reaction icon has been interacted with (e.g., a count), and/or the like. As used herein, "frequency of interaction" can refer to a rate at which a user or group of users interacts with a reaction icon within a period of time. As used herein, "recency of interaction" can refer to an interaction occurring within a period of time comparatively close to a present time. For example, an interaction one minute prior to present time is more recent than an interaction two days prior to present time. Such metrics (e.g., frequency of interaction, recency of interaction, number of interactions, etc.) can be determined based at least in part on interaction data associated with content of the communication platform. Such interaction data, as described above, can indicate how users interact with content of the communication platform (e.g., which emojis and/or reactjis are used for reactions, whether a reply is sent, a date and/or time associated with such reactions, users associated with such reactions, and/or the like).

In some examples, a set of reactions icons can be particular to a user, a group of users, or the communication platform, generally. That is, in at least one example, a set of reaction icons can be determined based on interaction data associated with a user and thus can be particular to the user. In such an example, the set of reaction icons can include one or more reaction icons that the user most frequently interacts with, most recently interacted with, has interacted with the highest number of times, etc. In some examples, such metrics (e.g., frequency, recency, count, etc.) can be used to determine a relevance metric. The search component 116 can rank reaction icons based at least in part on relevance metrics and can associate one or more reaction icons with the set based at least in part on the ranking. In some examples, the relevance metric can be determined using a machine-trained model. Such a machine-trained model can be trained using a machine learning mechanism (e.g., supervised, unsupervised, semi-supervised, deep, etc.) on training data which can include reaction icons, interaction data, and search queries associated with selected reaction icons. The machine-trained model can receive new interaction data and can output relevance metrics associated with reaction icons, which can be used for generating a set of reaction icons, as described above. That is, in at least one example, the search component 116 can determine a set of reaction icons based at least in part on one or more reaction icons that are associated with relevance metrics that meet or exceed a threshold, a number of reaction icons that are highest ranking, and/or the like.

In some examples, a set of reaction icons can be determined based on interaction data associated with a group of users. In such examples, the set of reaction icons can be particular to the group of users. In some examples, the group of users can be associated with a same group identifier (and thus the same workspace and/or organization) as the user, share one or more characteristics with the user (e.g., same role, same geographic area, same age, same preference, etc.), a similarity metric that satisfies a threshold, and/or the like. In at least one example, the set of reaction icons can include one or more reaction icons that users associated with the group of users most frequently interact with, most recently interacted with, have interacted with the highest number of times, etc. In some examples, such metrics (e.g., frequency, recency, count, etc.) can be used to determine a relevance metric. The search component 116 can rank reaction icons based at least in part on relevance metrics and can associate one or more reaction icons with the set based at least in part on the ranking.

In some examples, a set of reaction icons can be determined based on interaction data associated with the communication platform, and thus can be representative of all users of the communication platform. In such examples, the set of reaction icons can include one or more reaction icons that users associated with the communication platform most frequently interact with, most recently interacted with, have interacted with the highest number of times, etc. In some examples, such metrics (e.g., frequency, recency, count, etc.) can be used to determine a relevance metric. The search component 116 can rank reaction icons based at least in part on relevance metrics and can associate one or more reaction icons with the set based at least in part on the ranking.

In at least one example, a reaction icon presented in association with a set of reaction icons can comprise a search parameter such that upon receiving a search request associated with the reaction icon, the search component 116 can perform a search for content associated with the search component 116 that is associated with the reaction icon. If content associated with the search component 116 is identified, the search component 116 can return such content as a search result.

In at least one example, the channel management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform such as, for example, content and/or messages. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, administrator, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" can refer to a channel which is accessible across different organizations, whereas an "internal channel" can refer to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the channel management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118 can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or messages). In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) (e.g., recipient user(s)) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 125, channel data 126, direct message (DM) data 128, content data 129, and reaction icon(s) 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"). In some examples, a user can be associated with a single user profile. In some examples, a user can be associated with multiple user profiles. A user profile can store data associated with a user, including, but not limited to, one or more user identifiers associated with multiple, different organizations, groups, or entities with which the user is associated, one or more group identifiers for groups (or, organizations, teams, entities, or the like) with which the user is associated, one or more channel identifiers associated with channels to which the user has been granted access, an indication whether the user is an owner or manager of any channels, an indication whether the user has any channel restrictions, one or more direct message identifiers associated with direct messages with which the user is associated, one or more board identifiers associated with boards with which the user is associated, one or more meetings with which the user is associated, a plurality of messages, a plurality of emojis, a plurality of conversations, a plurality of conversation topics, an avatar, an email address, a real name (e.g., John Doe), a username (e.g., j doe), a password, a role, a preference, a time zone, a status, and the like.

In at least one example, the permission data 125 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 125 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 125 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 126. In some examples, permissions can indicate restrictions on individual channels, restrictions on user(s) associated with individual channels, and the like.

In some examples, the permission data 125 can store data associated with permissions of individual messages or other objects. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user (e.g., the originator of the message), or the like. In some examples, permissions associated with a message or other object can be mapped to, or otherwise associated with, data associated with the message or other object. In some examples, permissions can indicate viewing permissions, access permissions, editing permissions, etc.

In at least one example, the channel data 126 can store data associated with individual channels. In at least one example, the channel management component 118 can establish a channel between and among various user computing devices, allowing the user computing devices to communicate and share data between and among each other. In at least one example, a channel identifier may be assigned to a channel, which indicates the physical address in the channel data 126 where data related to that channel is stored. Individual messages or other objects posted to a channel can be stored in association with the channel data 126.

In at least one example, the DM data 128 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 128 where data related to that direct message is stored. Individual messages or other objects posted to a direct message can be stored in association with the DM data 128.

In at least one example, content data 129 can comprise content posted to channels, direct messages, and/or other virtual spaces. Content data 129 can include text content, audio content, visual content (e.g., image content and/or video content), combinations of the foregoing, etc. In at least one example, content stored in the content data 129 can be associated with a creator identifier (e.g., a user who created the content), a thread identifier (e.g., which thread the content is associated with), a message identifier (e.g., which message the content is associated with), a virtual space identifier (e.g., virtual space(s) with which the content is associated with and/or accessible by), etc. Interactions associated with content can also be stored in association with the content in the content data 129. That is, replies, reaction icons (e.g., emoji(s), reactji(s), etc.), etc. associated with individual content can be stored in association with the content. In some examples, content can be mapped to, or otherwise associated with, individual users, messages, meetings, channels, direct messages, and/or the like.

In at least one example, the datastore 122 can store one or more reaction icon(s) 130 or indications thereof. In at least one example, a reaction icon can comprise an icon representative of an emotion or a reaction. Examples of reaction icons include emojis and/or reactjis. In some examples, each reaction icon can be associated with a name and/or definition such that when the name and/or definition of a particular reaction icon is identified in data associated with the communication platform, a component of the communication platform can retrieve instructions for presenting the reaction icon via a user interface. That is, the name and/or definition of the reaction icon can be used to unfurl the reaction icon in data presented via a user interface of the communication platform. In some examples, reaction icons can be named and/or defined by the communication platform (e.g., a programmer associated therewith). In some examples, reaction icons can be named and/or defined by a user of the communication platform. In some examples, the user can be a programmer for a group or organization.

In some examples, interaction data associated with individual reaction icon(s) can be stored in association therewith. Such interaction data can indicate a count of the number of times a particular reaction icon has been used, which users have used the particular reaction icon, dates and/or times associated with the particular reaction icon was used, etc. In some examples, such interaction data can be used to determine a recency of interaction with a particular reaction icon (e.g., the most recent date and/or time the particular reaction icon was used by a user, a group of users, users of the communication platform), a frequency of interaction (e.g., how frequently a particular reaction is used by a user, a group of users, users of the communication platform), and/or the like, which can be stored in association with the reaction icon(s) 130 in the datastore 122.

The datastore 122 can store additional or alternative types of data, which can include, but is not limited to board data (e.g., data posted to or otherwise associated with boards of the communication platform), interaction data (e.g., data associated with additional or alternative interactions with the communication platform), model(s), etc.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), Hyper Text Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

In at least one example, the user computing device 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

As described above, a client, which can be associated with the user computing device 104, can present one or more user interfaces. A non-limiting example of a user interface 144 is shown in FIG. 1. As illustrated in FIG. 1, the user interface 144 can present data associated with one or more channels, direct messages, or other virtual spaces. In some examples, the user interface 144 can include a first section 146 (e.g., which can be a portion, pane, or other partitioned unit of the user interface 144), that includes user interface element(s) representing data associated with channel(s), direct message(s), etc. with which the user (e.g., account of the user) is associated. Additional details associated with the first section 146 and user interface element(s) are described below with reference to FIG. 2A.

In at least one example, the user interface 144 can include a second section 148 (e.g., which can be a portion, pane, or other partitioned unit of the user interface 144) that can be associated with a data feed indicating messages posted to and/or actions taken with respect to one or more channels, direct messages, and/or other virtual spaces for facilitating communications (e.g., a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated data feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) posted the message and/or performed an action. In examples where the second section 148 presents data associated with multiple workspaces, at least some data can be associated with an indication of which workspace the data is associated with.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 2A.

In at least one example, the user interface 144 can include a search mechanism 150 to enable a user to perform a search of content associated with the communication platform. As described above, content of the communication platform, can be searchable, for example by term (e.g., key word), reaction icon, user, date, virtual space, and/or the like. In at least one example, the search component 116 can provide an affordance (e.g., the search mechanism 150) via the user interface 144 to enable a user to search content of the communication platform via one or more search parameters. Such an affordance can enable a user to designate the one or more search parameters, which can be term(s), reaction icon(s), user(s), date(s), virtual space(s), and/or the like. In response to receiving a search request associated with one or more search parameters, the search component 116 can perform a search of the datastore 122. The datastore 122 can store content data 129, as described above. Based at least in part on identifying one or more items of content that satisfy the search parameters, the search component 116 can return one or more search results, as described above.

In at least one example, the search component 116 can determine set(s) of reaction icons to present via the user interface 144 to enable a user to search by reaction icon(s). In FIG. 1, a first set of reaction icons 152 is presented, which is particular to the user. In at least one example, the first set of reaction icons 152 can be determined by the search component 116 based at least in part on frequency of interaction between the user and individual reaction icons, recency of interaction between the user and individual reaction icons, and/or the like. In at least one example, a second set of reaction icons 154 is presented, which is associated with other user(s). That is, in some examples, a first set of reaction icons can be particular to the user and one or more other sets of reaction icons can be associated with at least one other user. In some examples, the second set of reaction icons 154 can be associated with a group of users that are similar to the user (e.g., based at least in part on a similarity metric meeting or exceeding a threshold), a group of users with which the user shares a characteristic (e.g., same group identifier, same role, same permission(s), a same set of channels and/or direct messages with which each user is associated, etc.), etc. In some examples, the second set of reaction icons 154 can be associated with all users of the communication platform. In at least one example, the user interface 144 can include a user interface element 156, which can provide an affordance to enable the user to view additional or alternative reaction icons. Any reaction icon— whether selected from the first set of reaction icons 152, the second set of reaction icons 154, or additional or alternative reaction icons presented in response to an actuation of the user interface element 156—can be used as a search parameter. In some examples, combinations of reaction icons can be used as search parameters. As described above, in at least one example, upon receiving a search request associated with the reaction icon, the search component 116 can perform a search for content associated with the communication platform (e.g., as stored in the content data 129) that is associated with the selected reaction icon. If content associated with the communication platform is identified, the search component 116 can return such content as a search result. Additional details are described below.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, microphones, cameras, connection ports and so forth.

While techniques described herein are described as being performed by the search component 116, the channel management component 118, the direct message management component 119, and the application 140, techniques described herein can be performed by any other component, or combination of components, which can be associated with the server(s) 102, the user computing device 104, or a combination thereof.

Figure 2A:
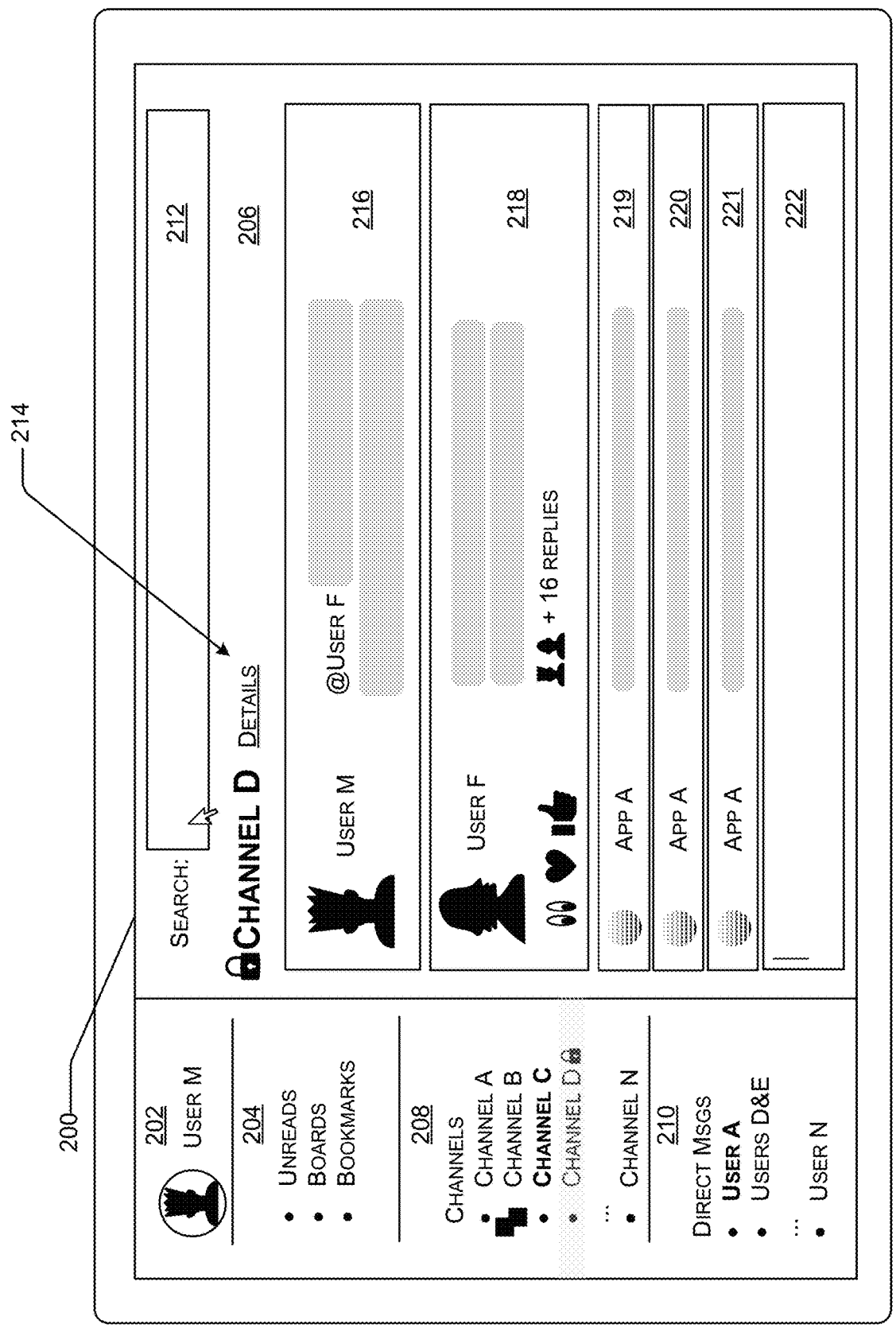
FIG. 2A illustrates an example user interface associated with a communication platform, as described herein, wherein the user interface includes an affordance to initiate a search of content associated with the communication platform.

FIG. 2A illustrates an example user interface 200 presented via a communication platform, as described herein. The user interface 200 can correspond to the user interface 144 described above with reference to FIG. 1. As described above, in some examples, a user interface 200 presented via the communication platform can include a first section 202 (which can correspond to the first section 146 described above with reference to FIG. 1) that includes user interface element(s) representing virtual space(s) associated with the workspace(s) with which the user (e.g., account of the user) is associated. In at least one example, the first section 202 can include one or more sub-sections, which can represent different virtual spaces. For example, a first sub-section 204 can include user interface elements representing virtual spaces that can aggregate data associated with a plurality of channels and/or workspaces. In at least one example, each virtual space can be associated with a user interface element in the first sub-section 204. In some examples, a user interface element can be associated with an actuation mechanism, that when actuated, can cause the application 140 to present data associated with the corresponding virtual space via a second section 206 of the user interface 200 (which can correspond to the second section 148 described above with reference to FIG. 1).

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 206, for example in a feed.

In another example, "drafts" can be associated with messages or other objects that have not yet been posted to a virtual space or otherwise sent to a receiving entity. In at least one example, a message, while being composed, can be associated with an indicator indicating that the message is a draft and can therefore be associated with the "drafts" referenced in the second sub-section 208.

In another example, "threads" can be associated with messages, files, etc. posted in threads to messages posted in a channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user.

In some examples, if the first sub-section 204 includes a user interface element representative of a virtual space associated with "snippets of content" (e.g., stories) that is actuated by a user, snippets of content associated with the user, which can be associated with different channels and/or virtual spaces, can be presented via the second section 206. In some examples, such snippets of content can be presented via a feed. For the purpose of this discussion, a snippet of content can correspond to audio and/or visual content provided by a user associated with the communication platform.

In another example, a virtual space can be associated with "boards" with which the user is associated. In at least one example, if the user requests to access the virtual space associated with "boards," one or more boards with which the user is associated can be presented via the user interface 200 (e.g., in the second section 206). In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such data can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

In some examples, data presented via the second section can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) (e.g., member(s) of a channel) posted a message, performed an action, and/or the like. Additional details are described below.

In at least one example, the first section 202 of the user interface 200 can include a second sub-section 208 that includes user interface elements representing channels to which the user (i.e., user profile) has access. In some examples, the channels can include public channels, private channels, shared channels (e.g., between workspaces or organizations), single workspace channels, cross-workspace channels, announcement channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 208 can depict all channels, or a subset of all channels, that the user has permission to access (e.g., as determined by the permission data 125). In such examples, the channels can be arranged alphabetically, based on most recent interaction, based on frequency of interactions, based on channel type (e.g., public, private, shared, cross-workspace, announcement, etc.), based on workspace, in user-designated sections, or the like. In some examples, the second sub-section 208 can depict all channels, or a subset of all channels, that the user is a member of, and the user can interact with the user interface 200 to browse or view other channels that the user is not a member of but are not currently displayed in the second sub-section 208. In some examples, a new channel, generated subsequent to a request received at the channel management component 118 in FIG. 1 and accessible to the user, can be added to the second sub-section 208. The new channel can be generated by the user or added to the second sub-section 208 in reply to acceptance of an invite sent to the user to join a new channel. In some examples, different types of channels (e.g., public, private, shared, etc.) can be in different sections of the second sub-section 208, or can have their own sub-sections or subsections in the user interface 200. In some examples, channels associated with different workspaces can be in different portions of the second sub-section 208, or can have their own sections or subsections in the user interface 200.

In some examples, the indicators can be associated with user interface elements that visually differentiate types of channels. For example, Channel B is associated with a double square user interface element instead of a circle user interface element. As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 208 of the user interface 200. In such examples, the user may navigate to a different interface (not shown) to browse additional channels that are accessible to the user but to which the user is not currently a member.

In addition to the second sub-section 208, the first section 202 can include a third subsection 210 that can include user interface elements representative of direct messages. That is, the third subsection 210 can include user interface elements representative of virtual spaces that are associated with private messages between one or more users, as described above.

As described above, in at least one example, the user interface 200 can include a second section 206 that can be associated with data associated with virtual spaces of the communication platform. In some examples, data presented via the second section 206 can be presented as a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) and/or entity(s) posted the message and/or performed an action.

A channel, direct message, or other virtual space can be associated with data and/or content other than messages, or data and/or content that is associated with messages. For example, non-limiting examples of additional data and/or content that can be presented via the second section 206 of the user interface 144 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc.

In some examples, the second section 206 can comprise a feed associated with a single channel. In such examples, data associated with the channel can be presented via the feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission(s), etc.).

In at least one example, the user interface 200 can include a search mechanism 212, wherein a user can input a search term and the server(s) 102 can perform a search associated with the communication platform. The search mechanism 212 can correspond to the search mechanism 150 of FIG. 1. In some examples, the search can be performed across each group with which the user is associated, or the search can be restricted to a particular group, based on a user specification. The search may be performed with one or more shards associated with each group across which the search is performed. As described above, a search can be associated with one or more search parameters, which can be used by the search component 116 to determine whether content stored in the content data 129 is associated with the search parameter(s). In some examples, a search parameter can be associated with a reaction icon, as described above. In at least one example, the application 140 can detect an interaction with the search mechanism 212. In at least one example, the application 140 can send an indication of the interaction to the server(s) 102. The search mechanism 116 can cause a search user interface to be presented via the user interface 200, as illustrated in FIG. 2B.

In FIG. 2A, the user can interact with the user interface element that corresponds to Channel D in the second subsection 208 and as such, a feed associated with the channel can be presented via the second section 206 of the user interface. In some examples, the second section 206 can be associated with a header that includes user interface elements 214 representing data associated with Channel D. Furthermore, the second section 206 can include user interface elements 216, 218, 219, 220, 221, and 222 which each represent messages posted to the channel (e.g., by a user and/or an application). As illustrated, the user interface elements representative of the messages 216-222 can include an indication of user(s) and/or entity(s) that posted the message, a time when the message was posted, content associated with the message, reactions associated with the message (e.g., emojis, reactjis, etc.), and/or the like. In at least one example, the second section 206 can include an input mechanism 222, which can be associated with a composition user interface to enable a user to compose a message to be posted to the channel. That is, in at least one example, a user can provide input via the input mechanism 222 (e.g., type, speak, etc.) to generate a new message. In some examples, messages can be generated by applications and/or automatically by the communication platform. In some examples, the second section 206 can include user interface elements representative of other objects and/or data associated with the channel (or other virtual space).

Figure 2B:
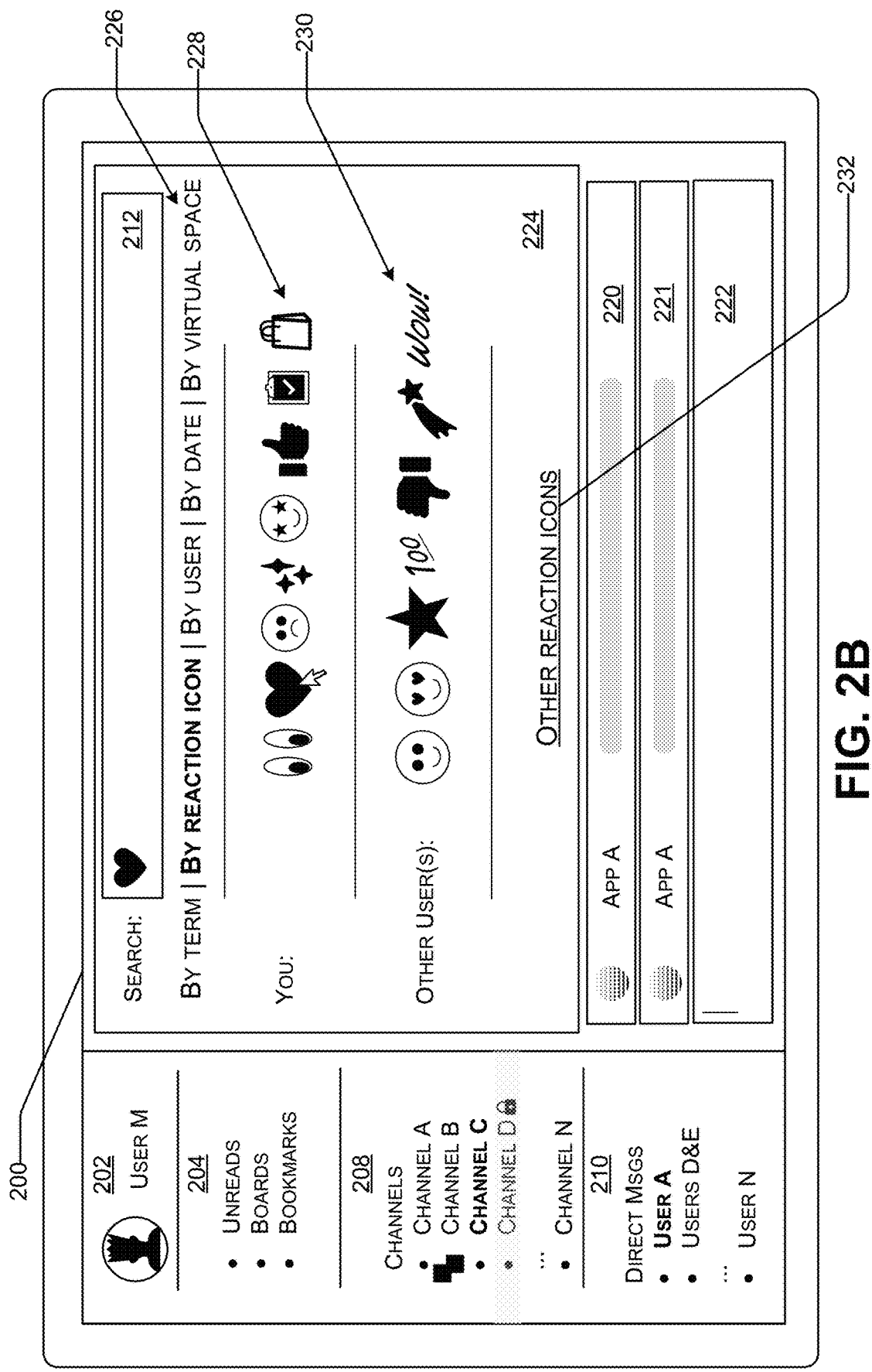
FIG. 2B illustrates another example of the user interface of FIG. 2A, wherein the user interface presents at least one set of reaction icons that are selectable to initiate the search using a reaction icon as a search parameter.

FIG. 2B illustrates an example of the user interface 200, wherein a search user interface 224 is presented to enable a user to designate search parameters associated with a search. As described above, content of the communication platform, can be searchable, for example by term (e.g., key word), reaction icon, user, date, virtual space, and/or the like. In at least one example, the search user interface 224 can include one or more mechanisms to enable a user to designate the one or more search parameters, which can be term(s), reaction icon(s), user(s), date(s), virtual space(s), and/or the like. In some examples, the user can input a search parameter in the search mechanism 212, for example via a text input, image input, speech input, or the like. As illustrated in FIG. 2B, the search user interface 224 can include one or more user interface elements 226 to enable the user to navigate to different types of search parameters (e.g., term(s) (e.g., key word(s)), reaction icon(s), user(s), date(s), virtual space(s), etc.). As described above, in response to receiving a search request associated with one or more search parameters, the search component 116 can perform a search of the datastore 122 for content associated with the one or more search parameters. The datastore 122 can store content data 129, as described above. Based at least in part on identifying one or more items of content (e.g., in the content data 129) that satisfy the search parameters, the search component 116 can return one or more search results, as described above.

As described above, the search component 116 can determine set(s) of reaction icons to present via the user interface 200 to enable a user to search by reaction icon(s). In FIG. 2B, a first set of reaction icons 228, which can correspond to the first set of reaction icons 152 of FIG. 1, is presented, which is particular to the user. In at least one example, the first set of reaction icons 228 can be determined by the search component 116 based at least in part on frequency of interaction between the user and individual reaction icons, recency of interaction between the user and individual reaction icons, and/or the like. In at least one example, a second set of reaction icons 230, which can correspond to the second set of reaction icons 154 of FIG. 1, is presented, which is associated with other user(s). That is, in some examples, a first set of reaction icons can be particular to the user and one or more other sets of reaction icons can be associated with at least one other user.

In some examples, the second set of reaction icons 230 can be associated with a group of users that are similar to the user (e.g., based at least in part on a similarity metric meeting or exceeding a threshold), a group of users with which the user shares a characteristic (e.g., same group identifier, same role, same permission(s), a same set of channels and/or direct messages with which each user is associated, etc.), etc. In some examples, the second set of reaction icons 230 can be associated with all users of the communication platform. In at least one example, the user interface 200 can include an affordance, which can be associated with a user interface element 232, to enable the user to view additional or alternative reaction icons. Interaction with the user interface element 232 can cause additional or alternative reaction icons to be presented via the user interface 200. In some examples, the additional or alternative reaction icons can be arranged based on relevance to the requesting user, alphabetically, based on topic, and/or the like. Any reaction icon—whether selected from the first set of reaction icons 228, the second set of reaction icons 230, or additional or alternative reaction icons presented in response to an actuation of the user interface element 232—can be used as a search parameter. In some examples, combinations of reaction icons can be used as search parameters.

As illustrated in FIG. 2B, in at least one example, each of the reaction icons can be associated with an actuation mechanism such that interaction with a particular reaction icon can indicate that the reaction icon has been selected. That is, the application 140 can detect an input associated with a reaction icon and can associate the selected reaction icon with a search query as a search parameter. The application 140 can send the search query to the server(s) 102 to initiate a search. As described above, in at least one example, upon receiving a search query associated with the reaction icon, the search component 116 can perform a search for content associated with the communication platform (e.g., as stored in the content data 129) that is associated with the selected reaction icon. If content associated with the communication platform is identified, the search component 116 can return such content as a search result.

Figure 2C:
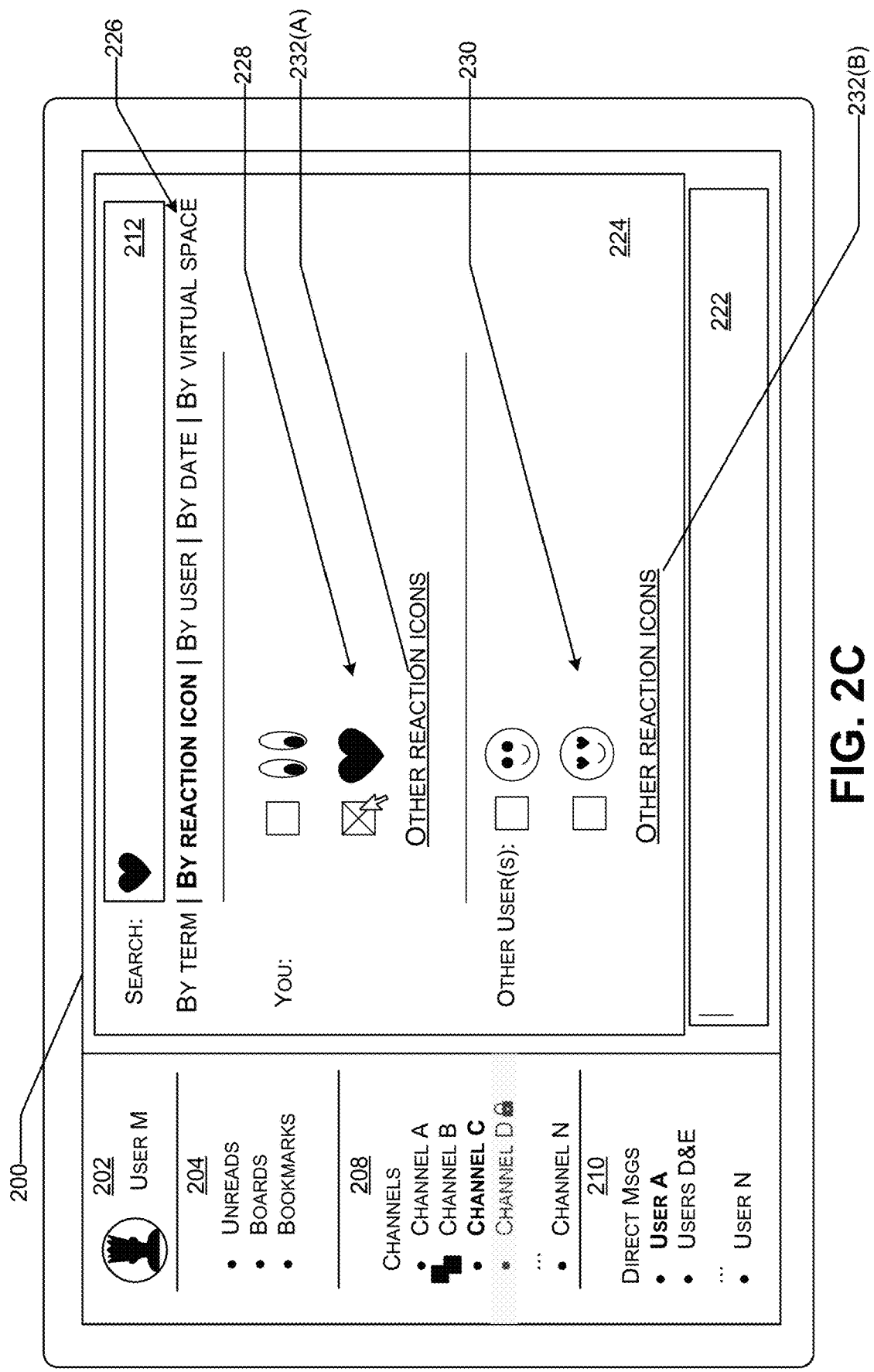
FIG. 2C illustrates another example of the user interface of FIG. 2A, wherein the user interface presents at least one set of reaction icons that are selectable to initiate the search using a reaction icon as a search parameter.

FIG. 2C illustrates another example of the user interface 200, wherein a search user interface 224 is presented. In FIG. 2C, the search user interface 224 includes a first set of reaction icons 228 and a second set of reaction icons 230, as presented and described above with reference to FIG. 2B. However, in FIG. 2C, each reaction icon is associated with a selectable user interface element to enable the user to indicate which reaction icon to include as a search parameter. In FIG. 2C, each of the sets of reaction icons are associated with user interface elements 232(A) and 232(B) to enable the user to view additional or alternative reaction icons. In some examples, the additional or alternative reaction icons that are presented and/or the order in which the additional or alternative reaction icons are presented can be different depending on which user interface element 232(A) or 232(B) is selected by the user.

Figure 2D:
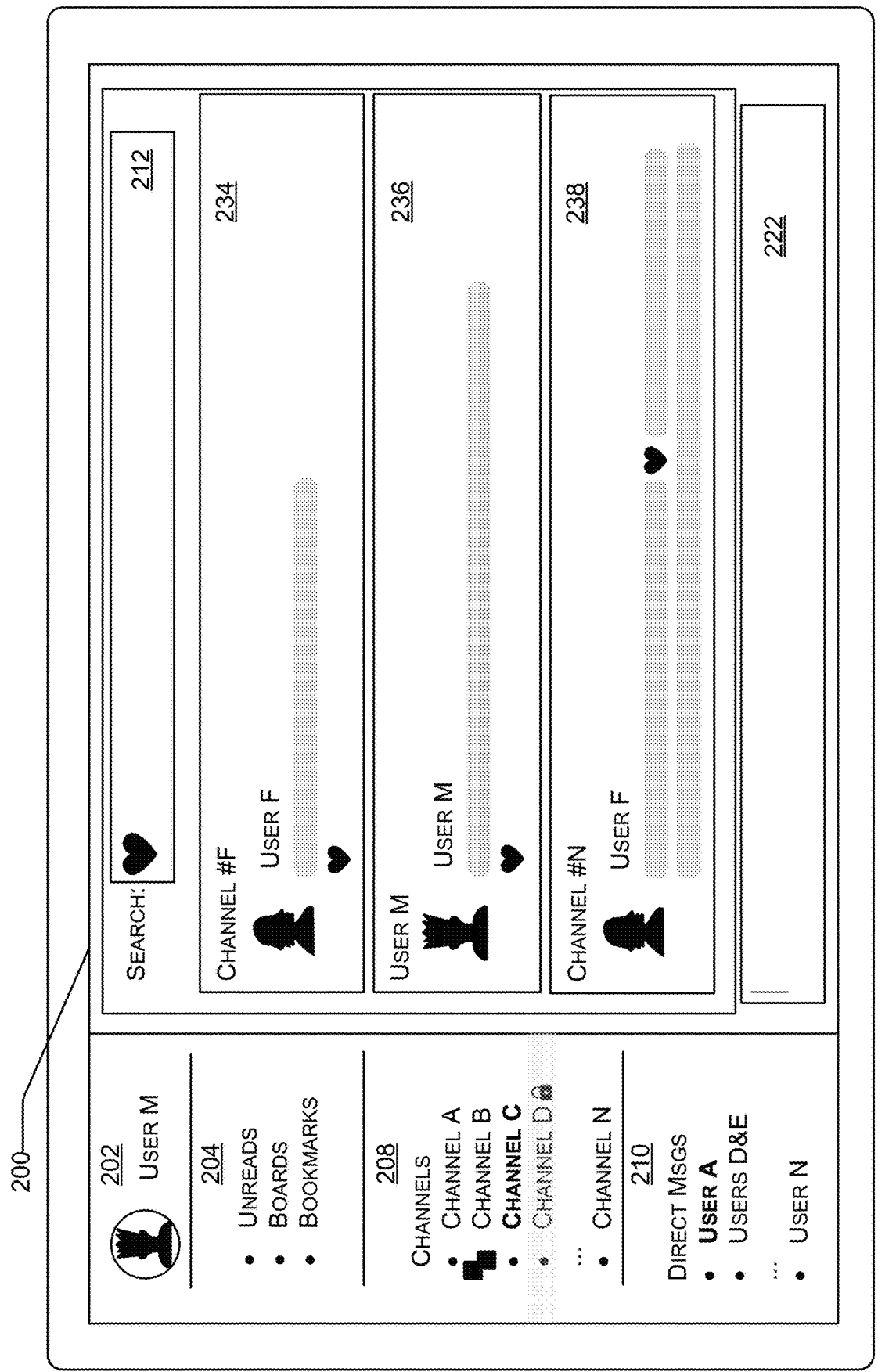
FIG. 2D illustrates another example of the user interface of FIG. 2A, wherein the user interface presents one or more search results based at least in part on a selected reaction icon.

FIG. 2D illustrates an example of the user interface 200 wherein one or more search results are presented via the user interface 200. In at least one example, selected reaction icon(s) can be used as search parameter(s). In FIG. 2D, the selected reaction icon is a heart. The application 140 can send a search query associated with a search parameter that corresponds to the selected reaction icon (e.g., the heart) to the server(s) 102. The search component 116 can perform a search of the content data 129 to determine whether any content items are associated with the selected reaction icon (e.g., the heart). Based at least in part on the search component 116 identifying one or more content items associated with the selected reaction icon (e.g., the heart), the search component 116 can send the one or more content items to the application 140 for presentation via the user interface 200. In at least one example, such content items can comprise messages or other actions associated with virtual spaces of the communication platform. The user interface 200 can be associated with user interface elements 234, 236, and 238 that are representative of each of the content items associated with the selected reaction icon. In at least one example, each of the user interface elements 234, 236, and 238 can be associated with an actuation mechanism that when actuated causes the corresponding message to be presented, in context (e.g., in the channel, direct message, etc.), via the user interface 200.

FIGS. 1-2D make reference to "user interface elements." A user interface element can be any element of the user interface that is representative of an object, message object, virtual space, and/or the like. A user interface element can be a text element, a graphical element, a picture, a logo, a symbol, and/or the like. In some examples, a user interface element can be presented as a pop-up, overlay, new sections of the user interface 200, a new user interface, part of another user interface element, and/or the like. In at least one example, individual of the user interface elements can be associated with actuation mechanisms. Such actuation mechanisms can make the corresponding user interface elements selectable or otherwise interactable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102. In some examples, the server(s) 102 can send data and/or instructions to the application 140 to generate new user interfaces and/or update the user interface 200, as described herein.

The example user interfaces and user interface elements described above are provided for illustrative purposes. In some examples, such user interfaces and user interface elements can include additional or alternative data, which can be presented in additional or alternative configurations. That is, the user interfaces and user interface elements should not be construed as limiting.

Figure 3:
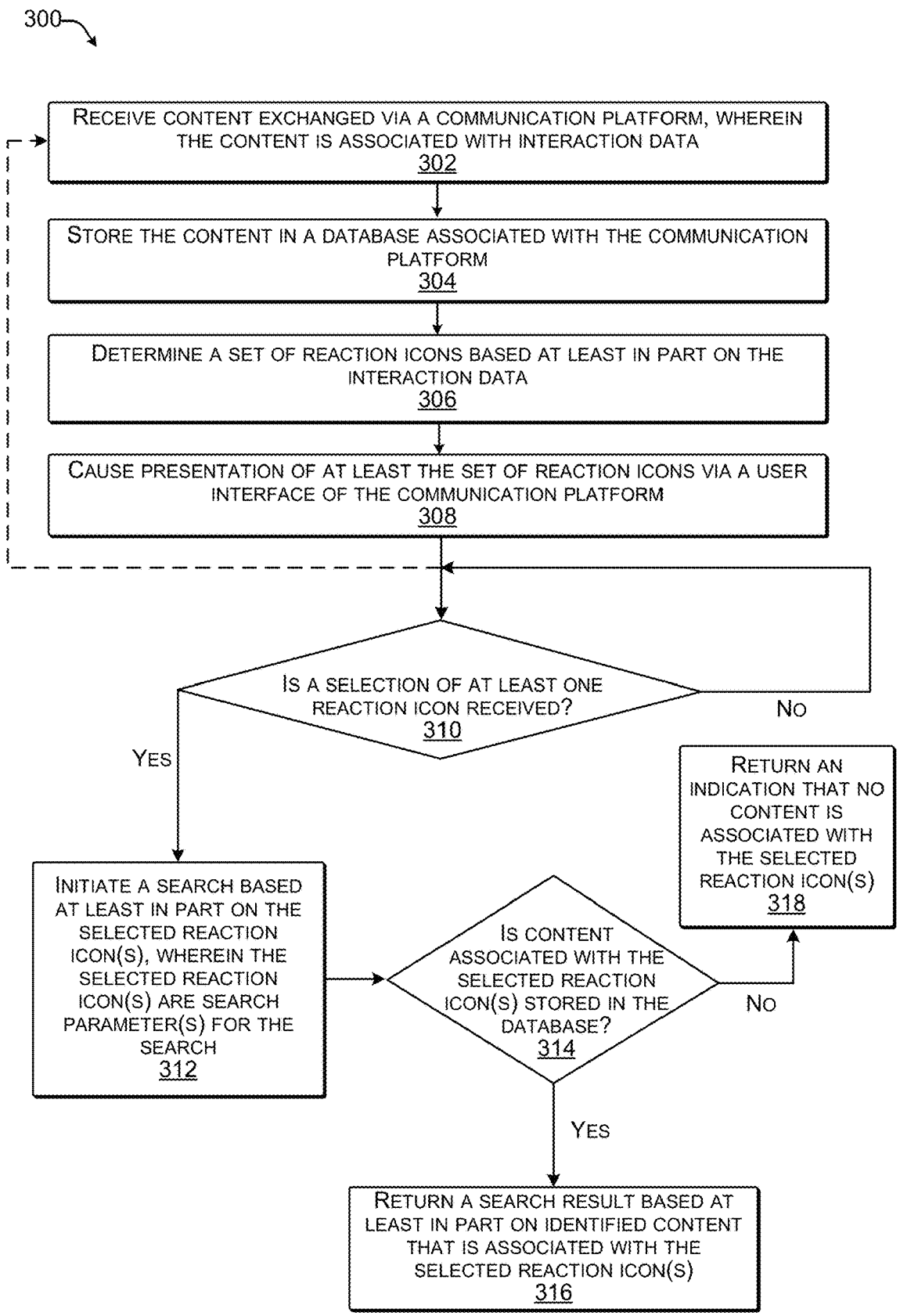
FIG. 3 illustrates an example process for determining a set of reaction icons that are selectable via a user interface to initiate a search of content exchanged via a communication platform, as described herein.
Figure 4:
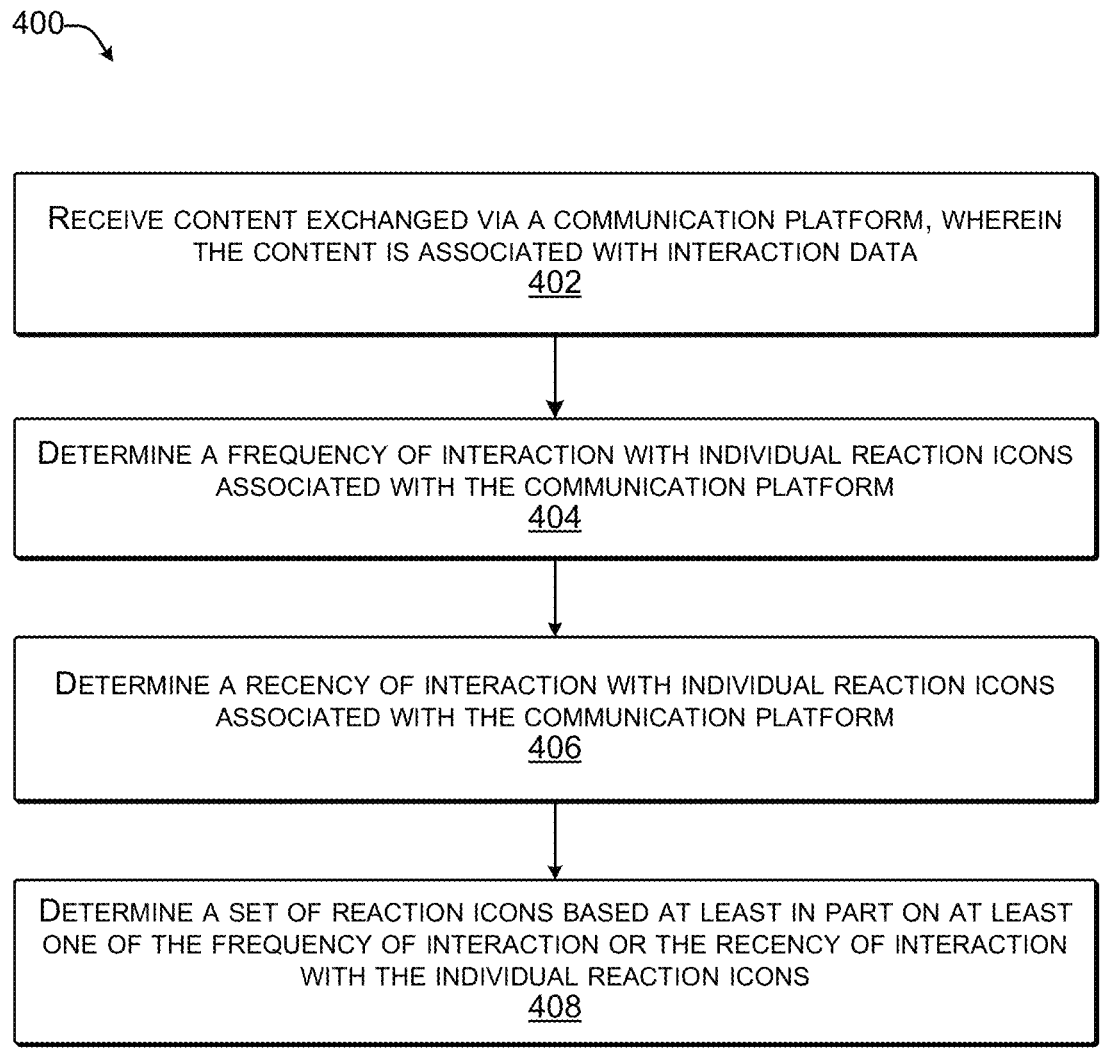
FIG. 4 illustrates an example process for determining a set of reaction icons based at least in part on interaction data associated with content exchanged via a communication platform, as described herein.

FIGS. 3 and 4 are flowcharts showing example processes involving techniques as described herein. The processes illustrated in FIGS. 3 and 4 are described with reference to components of the environment 100 shown in FIG. 1 for convenience and ease of understanding. However, the processes illustrated in FIGS. 3 and 4 are not limited to being performed using the components described above with reference to the environment 100. Moreover, the components described above with reference to the environment 100 are not limited to performing the processes illustrated in FIGS. 3 and 4.

The processes in FIGS. 3 and 4 are illustrated as collections of blocks in logical flowcharts, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, message objects, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 3 and 4 can be combined in whole or in part with each other or with other processes.

FIG. 3 illustrates an example process 300 for determining a set of reaction icons that are selectable via a user interface to initiate a search of content exchanged via a communication platform, as described herein.

At operation 302, the server(s) 102 can receive content exchanged via a communication platform, wherein the content is associated with interaction data. As described above, users associated with the communication platform can exchange data via one or more virtual spaces, such as channels (e.g., managed by the channel management component 118), direct messages (e.g., managed by the direct message management component 119), and/or other virtual spaces. In some examples, such data can comprise "content," which can be associated with messages. As described above, a "message," as used herein, can refer to any electronically generated digital object provided by a user of the communication platform. A message can be configured for presentation within a channel, a direct message, and/or another virtual space as described herein. In at least one example, a message can be associated with message content, which can include text data, image data, video data, audio data, file(s), etc. In some examples, one or more users of the communication platform can interact with a message, for example, by associating a reaction icon (e.g., an emoji, a reactji, or the like) with the message. In some examples, one or more users of the communication platform can interact with a message by replying to the message. In some examples, a reply can be posted to a feed associated with a channel, direct message, or other virtual space. In other examples, a reply can comprise a new message in a "thread." A thread can be a message associated with another message that is not posted to a channel, direct message, or other virtual space, but instead is maintained within an object associated with the original message. Messages and associated reactions (e.g., reaction icon(s) and/or reply(s)) can be stored in a datastore of the communication platform as "content" of the communication platform.

In at least one example, the content can be associated with interaction data, which can indicate whether a user interacted with a content item, for example, via associating a reaction icon therewith, sending a reply, and/or the like. In some examples, the search component 116 can determine metrics based at least in part on interaction data associated with the content. Such metrics can indicate frequency of interaction with individual reaction icons, recency of interaction with individual reaction icons, a number of interactions with individual reaction icons, and/or the like. As described above, "frequency of interaction" can refer to a rate at which a user or group of users interacts with a reaction icon within a period of time. Further, "recency of interaction" can refer to an interaction occurring within a period of time comparatively close to a present time.

At operation 304, the server(s) 102 can store the content in a database associated with the communication platform.

In at least one example, the database can comprise the content data 129, which can be associated with the datastore 122 of FIG. 1. In at least one example, content data 129 can comprise content posted to channels, direct messages, meetings, etc. Content data 129 can include text content, audio content, visual content (e.g., image content and/or video content), combinations of the foregoing, etc. In at least one example, content stored in the content data 129 can be associated with a creator identifier (e.g., a user who created the content), a thread identifier (e.g., which thread the content is associated with), a message identifier (e.g., which message the content is associated with), a virtual space identifier (e.g., virtual space(s) with which the content is associated with and/or accessible by), etc. Interactions associated with content can also be stored in association with the content in the content data 129. That is, interaction data indicating replies, reaction icons (e.g., emoji(s), reactji(s), etc.), etc. associated with individual content can be stored in association with the content. In some examples, content can be mapped to, or otherwise associated with, individual users, messages, meetings, channels, direct messages, and/or the like.

At operation 306, the search component 116 can determine a set of reaction icons based at least in part on the interaction data. In at least one example, the search component 116 can determine set(s) of reaction icons to present via a user interface to enable a user to search by reaction icon(s). As described above, a set of reaction icons can comprise one or more reaction icons. Further, as described above, a set of reaction icons can include one or more emojis, reactjis, or the like. Set(s) of reaction icons can be determined based at least in part on interaction data, from which frequency of interaction with individual reaction icons, recency of interaction with individual reaction icons, a number of times a particular reaction icon has been interacted with (e.g., a count), and/or the like can be determined. In at least one example, the search component 116 can access the reaction icon(s) 130 in the datastore 122. As described above, the reaction icon(s) 130 can be associated with interaction data and/or metrics determined therefrom, which can be used by the search component 116 to determine set(s) of reaction icons.

In some examples, a set of reactions icons can be particular to a user, a group of users, or the communication platform, generally. That is, in at least one example, a set of reaction icons can be determined based at least in part on interaction data associated with a user and thus can be particular to the user. In such an example, the set of reaction icons can include one or more reaction icons that the user most frequently interacts with, most recently interacted with, has interacted with the highest number of times, etc. In some examples, such metrics (e.g., frequency, recency, count, etc.) can be used to determine a relevance metric. The search component 116 can rank reaction icons based at least in part on relevance metrics and can associate one or more reaction icons with the set based at least in part on the ranking. In some examples, the relevance metric can be determined using a machine-trained model. Such a machine-trained model can be trained using a machine learning mechanism (e.g., supervised, unsupervised, semi-supervised, deep, etc.) on training data which can include reaction icons, interaction data, and search queries associated with selected reaction icons. The machine-trained model can receive new interaction data and can output relevance metrics associated with reaction icons, which can be used for generating a set of reaction icons, as described above.

In some examples, a set of reaction icons can be determined based at least in part on interaction data associated with a group of users. In such examples, the set of reaction icons can be particular to the group of users. In some examples, the group of users can be associated with a same group identifier (and thus the same workspace and/or organization) as the user, share one or more characteristics with the user (e.g., same role, same geographic area, same age, same preference, etc.), a similarity metric that satisfies a threshold, and/or the like. In at least one example, the set of reaction icons can include one or more reaction icons that users associated with the group of users most frequently interact with, most recently interacted with, have interacted with the highest number of times, etc. In some examples, such metrics (e.g., frequency, recency, count, etc.) can be used to determine a relevance metric. The search component 116 can rank reaction icons based at least in part on relevance metrics and can associate one or more reaction icons with the set based at least in part on the ranking.

In some examples, a set of reaction icons can be determined based at least in part on interaction data associated with the communication platform, and thus can be representative of all users of the communication platform. In such examples, the set of reaction icons can include one or more reaction icons that users associated with the communication platform most frequently interact with, most recently interacted with, have interacted with the highest number of times, etc. In some examples, such metrics (e.g., frequency, recency, count, etc.) can be used to determine a relevance metric. The search component 116 can rank reaction icons based at least in part on relevance metrics and can associate one or more reaction icons with the set based at least in part on the ranking.

At operation 308, the search component 116 can cause presentation of at least the set of reaction icons via a user interface of the communication platform. In at least one example, the search component 116 can cause presentation of at least one set of reaction icons via a user interface of the communication platform. In at least one example, the set(s) of reaction icons can be presented in association with a search user interface that can be presented in response to an interaction with a search mechanism presented via the user interface. An example of such a search user interface is provided above with reference to FIGS. 2B and 2C.

At operation 310, the search component 116 can determine whether a selection of at least one reaction icon is received. In at least one example, each of the reaction icons associated with the set of reaction icons can be associated with an actuation mechanism or other selection mechanism such that interaction with the actuation mechanism or other selection mechanism can indicate that a particular reaction icon has been selected. That is, in at least one example, the application 140 can detect an input associated with a reaction icon and can associate the selected reaction icon with a search query as a search parameter. The application 140 can send the search query to the server(s) 102 to initiate a search. In at least one example, the search component 116 can determine that a selection of at least one reaction icon is received based at least in part on receiving the search query associated with the selected reaction icon(s). In at least one example, the selected reaction icon(s) can comprise search parameter(s) for conducting the search.

If a selection is not received, the search component 116 can wait until a selection is received, as illustrated by the arrow returning to operation 310. In some examples, a selection may not be received within a period of time and/or before the user navigates away from the search user interface. In some examples, if a selection is not received, and a period of time has lapsed and/or the user navigates away from the search user interface, the process 300 can return to operation 302, as illustrated by the dashed arrow returning to operation 302.

At operation 312, based at least in part on a selection of at least one reaction icon being received (i.e., "yes" at operation 312), the search component 116 can initiate a search based at least in part on the selected reaction icon(s), wherein the selected reaction icon(s) are search parameter(s) for the search.

At operation 314, the search component 116 can determine whether content associated with the selected reaction icon(s) are stored in the database. In at least one example, selected reaction icon(s) can be used as search parameter(s). The application 140 can send a search query associated with a search parameter that corresponds to the selected reaction icon to the server(s) 102. The search component 116 can perform a search of the content data 129 to determine whether any content items are associated with the selected reaction icon(s). That is, the search component 116 can analyze content stored in the content data 129 to determine whether any of the content is associated with the selected reaction icon(s). In some examples, the selected reaction icon can be associated with message content, a reaction, a reply, and/or the like.

At operation 316, based at least in part on determining that content associated with the selected reaction icon(s) is stored in the database (i.e., "yes" at operation 314), the search component 116 can return a search result based at least in part on the identified content that is associated with the selection reaction icon(s). Based at least in part on the search component 116 identifying one or more content items associated with the selected reaction icon, the search component 116 can send the one or more content items to the application 140 for presentation via a user interface of the communication platform. In at least one example, such content items can comprise messages or other actions associated with virtual spaces of the communication platform. In at least one example, the user interface can include one or more user interface elements representative of each of the search results. In at least one example, each user interface element can be associated with an actuation mechanism that when actuated causes the corresponding content item to be presented, in context (e.g., in the channel, direct message, etc.), via the user interface. An example of a user interface presenting search results associated with selected reaction icon(s) is illustrated above with reference to FIG. 2D.

At operation 318, based at least in part on determining that there isn't content associated with the selected reaction icon(s) stored in the database (i.e., "no" at operation 314), the search component 116 can return an indication that no content is associated with the selected reaction icon(s).

FIG. 4 illustrates an example process 400 for determining a set of reaction icons based at least in part on interaction data associated with content exchanged via a communication platform, as described herein.

At operation 402, the server(s) 102 can receive content exchanged via a communication platform, wherein the content is associated with interaction data, as described above with reference to operation 302 of FIG. 3.

At operation 404, the search component 116 can determine a frequency of interaction with individual reaction icons associated with the communication platform. In at least one example, a "frequency of interaction" can refer to a rate at which a user or group of users interacts with a reaction icon within a period of time. In at least one example, the search component 116 can analyze interaction data to determine a rate at which a user or group of users interacts with individual reaction icons. In some examples, such a metric (e.g., frequency of interaction) can be associated with individual reaction icons.

At operation 406, the search component 116 can determine a recency of interaction with individual reaction icons associated with the communication platform. In at least one example, a "recency of interaction" can refer to an interaction occurring within a period of time comparatively close to a present time. In at least one example, the search component 116 can analyze interaction data to determine timing associated with interactions with individual reaction icons and can determine recency based on such timing. In some examples, such a metric (e.g., recency of interaction) can be associated with individual reaction icons.

At operation 408, the search component 116 can determine a set of reaction icons based at least in part on at least one of the frequency of interaction or the recency of interaction with the individual reaction icons. Additional details associated with determining set(s) of reaction icons are described above with reference to operation 306 of FIG. 3.

Techniques described herein, with reference to FIGS. 1-4, can be helpful for easily retrieving content associated with the communication platform. As described above, in an example, a user can desire to recall a message posted to a channel where other users reacted with a particular reaction icon (e.g., a dancing chicken reactji). In existing techniques a user can search via a term, a user, a date, a virtual space, or the like, but the user may not recall a term, user, date, virtual space, or the like associated with the message. The user may recall how people reacted (e.g., using a dancing chicken reactji). In some existing techniques, if a user knows how a particular reaction icon is named or defined, the user could input the name or definition of the particular reaction icon (e.g., :dancing chicken:) into the search affordance. However, if a user does not know how a particular reaction icon is named or defined, the user may be left without a mechanism to retrieve the content. As such, techniques described herein offer an improvement to existing search technology.

As described above, techniques described herein utilize interaction data associated with content exchanged via the communication platform to determine set(s) of reaction icons that are relevant to a particular user. As described above, at least one set of reaction icons can be determined based at least in part on frequency and/or recency of interaction with particular reaction icons, for example, by the user or a group of users with which the user may be similar to or otherwise related. As such, the communication platform can cause set(s) of reaction icons to be presented via a user interface, that are in some examples relevant or otherwise personalized for a user, to enable the user to select or otherwise set search parameters for a search.

Techniques described herein offer improvements over existing search technologies by improving user interfaces used to facilitate searches, reducing the number of interactions required to retrieve content, and/or streamlining user interaction with user interfaces. That is, by presenting an affordance for a user to designate search parameters via an interaction with set(s) of reaction icons, techniques described herein provide a more user-friendly mechanism to initiate a search. As described herein, the set(s) of reaction icons can be determined to be relevant to a particular user and thus can narrow, at least initially, the search parameters presented for the user for selection. Further, by presenting an affordance for a user to designate search parameters via an interaction with set(s) of reaction icons, techniques described herein eliminate the need for a user to recall a term, user, virtual space, date, reaction icon name and/or definition, and/or the like. As such, search queries can be more accurate and/or precise, thereby reducing the number of interactions required to retrieve content via a search. This can conserve bandwidth and computing resources. Moreover, by determining and/or presenting relevant information, users need not navigate through various search parameter possibilities and search results can be more accurate and/or precise (due to search queries being more accurate and/or precise). As such, techniques described herein offer improvements over conventional search technologies.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. A method, implemented by at least one computing device of a communication platform, comprising: determining a set of reaction icons based at least in part on interaction data associated with content in the communication platform; causing presentation of at least the set of reaction icons via a user interface of the communication platform, wherein individual reaction icons associated with the set of reaction icons are selectable as search parameters in the user interface; receiving a selection of at least one reaction icon of the set of reaction icons; and in response to receiving the selection of the at least one reaction icon, initiating a search for content associated with the selection of the at least one reaction icon stored in a database associated with the communication platform.

B. The method of paragraph A, wherein the set of reaction icons is a first set of reaction icons associated with a user of the communication platform.

C. The method of paragraph B, further comprising causing presentation of a second set of reaction icons via the user interface, wherein the second set of reaction icons is associated with at least one different user of the communication platform.

D. The method of any of paragraphs A-C, further comprising: determining, based at least in part on the interaction data, recency of interactions with individual reaction icons associated with the communication platform; and determining the set of reaction icons further based at least in part on the recency of interactions determined for the individual reaction icons.

E. The method of any of paragraphs A-D, further comprising: determining, based at least in part on the interaction data, frequencies of interactions with individual reaction icons associated with the communication platform; and determining the set of reaction icons further based at least in part on the frequencies of interactions determined for the individual reaction icons.

F. The method of any of paragraphs A-E, wherein the individual reaction icons are representative of at least one of an emoji or a reactji.

G. The method of any of paragraphs A-F, further comprising causing, based at least in part on initiating the search of the database, one or more results to be presented via the user interface, wherein the one or more results are associated with the at least one reaction icon.

H. A system comprising: one or more processors; and one or more non-transitory computer-readable media storing instructions that, when executed by the one or more processors, cause the system to perform operations comprising: determining a set of reaction icons based at least in part on interaction data associated with content in a communication platform; causing presentation of at least the set of reaction icons via a user interface of the communication platform, wherein individual reaction icons of the set of reaction icons are selectable as search parameters in the user interface; receiving a selection of at least one reaction icon of the set of reaction icons; and in response to receiving the selection of the at least one reaction icon, initiating a search for content associated with the selection of the at least one reaction icon stored in a database associated with the communication platform.

I. The system of paragraph H, wherein the set of reaction icons is a first set of reaction icons associated with a user of the communication platform.

J. The system of paragraph I, the operations further comprising causing presentation of a second set of reaction icons via the user interface, wherein the second set of reaction icons is associated with at least one different user of the communication platform.

K. The system of any of paragraphs H-J, the operations further comprising: determining, based at least in part on the interaction data, recency of interactions with individual reaction icons associated with the communication platform; and determining the set of reaction icons further based at least in part on the recency of interactions determined for the individual reaction icons.

L. The system of any of paragraphs H-K, the operations further comprising: determining, based at least in part on the interaction data, frequencies of interactions with individual reaction icons associated with the communication platform; and determining the set of reaction icons further based at least in part on the frequencies of interactions determined for the individual reaction icons.

M. The system of any of paragraphs H-L, wherein the individual reaction icons are representative of at least one of an emoji or a reactji.

N. The system of any of paragraphs H-M, the operations further comprising, causing, based at least in part on initiating the search of the database, one or more results to be presented via the user interface, wherein the one or more results are associated with the at least one reaction icon.

O. One or more non-transitory computer-readable media storing instructions that, when executed by one or more processors, cause the one or more processors to perform operations comprising: determining a set of reaction icons based at least in part on interaction data associated with content in a communication platform; causing presentation of at least the set of reaction icons via a user interface of the communication platform, wherein individual reaction icons of the set of reaction icons are selectable as search parameters in the user interface; receiving a selection of at least one reaction icon of the set of reaction icons; and in response to receiving the selection of the at least one reaction icon, initiating a search for content associated with the selection of the at least one reaction icon stored in a database associated with the communication platform.

P. The one or more non-transitory computer-readable media of paragraph O, wherein the set of reaction icons is a first set of reaction icons associated with a user of the communication platform.

Q. The one or more non-transitory computer-readable media of paragraph P, the operations further comprising causing presentation of a second set of reaction icons via the user interface, wherein the second set of reaction icons is associated with at least one different user of the communication platform.

R. The one or more non-transitory computer-readable media of any of paragraphs O-Q, the operations further comprising: determining, based at least in part on the interaction data, recency of interactions with individual reaction icons associated with the communication platform; and determining the set of reaction icons further based at least in part on the recency of interactions determined for the individual reaction icons.

S. The one or more non-transitory computer-readable media of any of paragraphs O-R, the operations further comprising: determining, based at least in part on the interaction data, frequencies of interactions with individual reaction icons associated with the communication platform; and determining the set of reaction icons further based at least in part on the frequencies of interactions determined for the individual reaction icons.

T. The one or more non-transitory computer-readable media of any of paragraphs O-S, wherein the individual reaction icons are representative of at least one of an emoji or a reactji.

While the paragraphs above are described with respect to one particular implementation, it should be understood that, in the context of this document, the content of the paragraphs above can also be implemented via a method, device, system, a computer-readable medium, and/or another implementation. Additionally, any of paragraphs A-T may be implemented alone or in combination with any other one or more of the paragraphs A-T.

The invention claimed is:

1. A method, implemented by at least one computing device of a communication platform, comprising:
   determining interaction data representing interactions of users of the communication platform with reaction icons presented for display via the communication platform, the interaction data including at least one of a number of interactions with the reaction icons, a frequency of interaction with the reaction icons, or a recency of interaction with the reaction icons;
   determining a set of the reaction icons based at least in part on the interaction data; and
   causing presentation of the set of the reaction icons via a user interface of the communication platform.

2. The method as recited in claim 1, wherein individual reaction icons of the set of the reaction icons are selectable as search parameters in the user interface to identify content within the communication platform that is associated with the individual reaction icons.

3. The method as recited in claim 1, further comprising:
   receiving, via the user interface, a selection of a reaction icon of the set of the reaction icons in association with a message posted within a virtual space; and
   in response to receiving the selection of the reaction icon, causing presentation of the reaction icon in association with the message within the virtual space.

4. The method as recited in claim 1, further comprising:
   receiving a selection of a reaction icon of the set of the reaction icons;
   in response to receiving the selection of the reaction icon, initiating a search for one or more contents that are associated with the reaction icon; and
   in response to initiating the search, causing display of at least one content of the one or more contents in the user interface.

5. The method as recited in claim 1, wherein the number of interactions occurs within a preceding period of time with respect to causing the presentation of the set of the reaction icons, further comprising determining the set of the reaction icons based at least in part on the number of interactions occurring within the preceding period of time.

6. The method as recited in claim 1, wherein the frequency of interaction indicates a rate at which user profiles of the communication platform interact with the reaction icons during a preceding period of time with respect to causing the presentation of the set of the reaction icons, further comprising determining the set of the reaction icons based at least in part on the frequency of interaction occurring within the preceding period of time.

7. The method as recited in claim 1, wherein the recency of interaction indicates amounts of time between the interactions and a current time, further comprising determining the set of the reaction icons based at least in part on the recency of interaction.

8. The method as recited in claim 1, wherein the set of the reaction icons are presented in association with a user profile of the communication platform, further comprising:
   determining user data associated with the user profile, wherein the user data indicates one or more reaction icons previously input or selected in association with the user profile; and
   determining the set of the reaction icons based at least in part on the user data.

9. The method as recited in claim 1, wherein the set of the reaction icons are presented in association with a user profile of the communication platform, further comprising:
   determining user data associated with one or more other user profiles of the communication platform that are determined to be similar to the user profile, wherein the user data indicates a plurality of reaction icons previously input or selected in association with the one or more other user profiles; and
   determining the set of the reaction icons based at least in part on the user data.

10. A system comprising:
    one or more processors;
    memory; and
    one or more computer-executable instructions stored in the memory and executable by the one or more processors to perform operations comprising:
      determining interaction data representing interactions of users of a communication platform with reaction icons presented for display via the communication platform, the interaction data including at least one of a number of interactions with the reaction icons, a frequency of interaction with the reaction icons, or a recency of interaction with the reaction icons;

determining a set of the reaction icons based at least in part on the interaction data; and causing presentation of the set of the reaction icons via a user interface of the communication platform.

11. The system as recited in claim 10, wherein individual reaction icons of the set of the reaction icons are selectable as search parameters in the user interface to identify content within the communication platform that is associated with the individual reaction icons.

12. The system as recited in claim 10, wherein the operations further comprise:

receiving, via the user interface, a selection of a reaction icon of the set of the reaction icons in association with a message posted within a virtual space; and in response to receiving the selection of the reaction icon, causing presentation of the reaction icon in association with the message within the virtual space.

13. The system as recited in claim 10, wherein the operations further comprise:

receiving a selection of a reaction icon of the set of the reaction icons;

in response to receiving the selection of the reaction icon, initiating a search for one or more contents that are associated with the reaction icon; and in response to initiating the search, causing display of at least one content of the one or more contents in the user interface.

14. The system as recited in claim 10, wherein the number of interactions occurs within a preceding period of time with respect to causing the presentation of the set of the reaction icons, further comprising determining the set of the reaction icons based at least in part on the number of interactions occurring within the preceding period of time.

15. The system as recited in claim 10, wherein the frequency of interaction indicates a rate at which user profiles of the communication platform interact with the reaction icons during a preceding period of time with respect to causing the presentation of the set of the reaction icons, further comprising determining the set of the reaction icons based at least in part on the frequency of interaction occurring within the preceding period of time.

16. The system as recited in claim 10, wherein the recency of interaction indicates amounts of time between the interactions and a current time, further comprising determining the set of the reaction icons based at least in part on the recency of interaction.

17. One or more non-transitory computer-readable media storing one or more computer-executable instructions that, when executed by one or more processors, cause the one or more processors to perform operations comprising:

determining interaction data representing interactions of users of a communication platform with reaction icons presented for display via the communication platform, the interaction data including at least one of a number of interactions with the reaction icons, a frequency of interaction with the reaction icons, or a recency of interaction with the reaction icons;

determining a set of the reaction icons based at least in part on the interaction data; and causing presentation of the set of the reaction icons via a user interface of the communication platform.

18. The one or more non-transitory computer-readable media as recited in claim 17, wherein the set of the reaction icons are presented in association with a user profile of the communication platform, further comprising:

determining user data associated with the user profile, wherein the user data indicates one or more reaction icons previously input or selected in association with the user profile; and determining the set of the reaction icons based at least in part on the user data.

19. The one or more non-transitory computer-readable media as recited in claim 17, wherein the set of the reaction icons are presented in association with a user profile of the communication platform, further comprising:

determining user data associated with one or more other user profiles of the communication platform that are determined to be similar to the user profile, wherein the user data indicates a plurality of reaction icons previously input or selected in association with the one or more other user profiles; and determining the set of the reaction icons based at least in part on the user data.

20. The one or more non-transitory computer-readable media as recited in claim 17, wherein:

the number of interactions occurs within a preceding period of time with respect to causing the presentation of the set of the reaction icons, further comprising determining the set of the reaction icons based at least in part on the number of interactions occurring within the preceding period of time;

the frequency of interaction indicates a rate at which user profiles of the communication platform interact with the reaction icons during a preceding period of time with respect to causing the presentation of the set of the reaction icons, further comprising determining the set of the reaction icons based at least in part on the frequency of interaction occurring within the preceding period of time; and the recency of interaction indicates amounts of time between the interactions and a current time, further comprising determining the set of the reaction icons based at least in part on the recency of interaction.

\* \* \* \* \*